(12) United States Patent
Yang et al.

(10) Patent No.: US 11,683,469 B2
(45) Date of Patent: Jun. 20, 2023

(54) STEREOSCOPIC IMAGE DISPLAY DEVICE (71) Applicant: Lixel Inc., Taipei (TW)

(72) Inventors: Chun-Hsiang Yang, Hsinchu (TW);
Chih-Hung Ting, New Taipei (TW);
Kai-Chieh Chang, Kaohsiung (TW);
Hsin-You Hou, New Taipei (TW);
Kuan-Yu Chen, Taichung (TW)

(73) Assignee: Lixel Inc., Taipei (TW)

( * ) Notice: Subject to any disclaimer, the term of this patent is extended or adjusted under 35 U.S.C. 154(b) by 7 days.

(21) Appl. No.: 17/369,960

(22) Filed: Jul. 8, 2021

(65) Prior Publication Data

US 2022/0321863 A1 Oct. 6, 2022

(30) Foreign Application Priority Data

Mar. 31, 2021 (TW) .................................. 110111910

(51) Int. Cl.
*G02F 1/1335* (2006.01)
*H04N 13/307* (2018.01)
*G02F 1/1339* (2006.01)

(52) U.S. Cl.
CPC ......... *H04N 13/307* (2018.05); *G02F 1/1339* (2013.01); *G02F 1/133526* (2013.01)

(58) Field of Classification Search
CPC ................................................ G02F 1/133526
See application file for complete search history.

(56) References Cited

U.S. PATENT DOCUMENTS

2018/0338137 A1* 11/2018 Wang .................... H04N 13/322
2022/0155612 A1* 5/2022 Guo ...................... H04N 13/307

FOREIGN PATENT DOCUMENTS

CN 111552093 A 8/2020

* cited by examiner

*Primary Examiner* — Edmond C Lau
(74) *Attorney, Agent, or Firm* — Li & Cai Intellectual Property Office (57) ABSTRACT

A stereoscopic image display device is provided and includes a flat panel display unit, a lens array unit, and a spacer unit. The flat panel display unit has a display surface. The lens array unit includes at least one condenser lens, which is disposed on a side of the display surface. The spacer unit is disposed between the display surface and the condenser lens, such that the lens array unit and the flat panel display unit are spaced apart from each other. In a light field system of the stereoscopic image display device, an object distance between the display surface of the flat panel display unit and the condenser lens of the lens array unit is configured to enable an absolute value of a central depth plane (CDP) of the stereoscopic image display device in the light field system to be between 1 mm and 200 mm.

4 Claims, 6 Drawing Sheets

FIG. 6

STEREOSCOPIC IMAGE DISPLAY DEVICE

CROSS-REFERENCE TO RELATED PATENT APPLICATION

This application claims the benefit of priority to Taiwan Patent Application No. 110111910, filed on Mar. 31, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a stereoscopic image display device, and more particularly to a stereoscopic image display device for improving a display quality of a stereo image.

BACKGROUND OF THE DISCLOSURE

Generally, a conventional stereoscopic image display device may include many different light-transmitting layers disposed between display pixels of a flat panel display and a lens array unit, such as an optical material layer (i.e., a protective film, a diffuser film, a brightness enhancement film, and/or a light guide plate) that covers the display pixels, or a lens support base layer used to support the lens array unit.

However, the manner in which the above-mentioned light-transmitting layers are designed is not taken into specific consideration in the conventional stereoscopic image display device. Moreover, no special consideration is given to an object distance between the flat panel display and the lens array unit in the conventional stereoscopic image display device, such that when the conventional stereoscopic image display device is operated to produce a stereo image, the stereo image often has a poor image quality, such as that resulting from color blocking or poor resolution.

SUMMARY OF THE DISCLOSURE

In response to the above-referenced technical inadequacies, the present disclosure provides a stereoscopic image display device.

In one aspect, the present disclosure provides a stereoscopic image display device which includes a flat panel display unit, a lens array unit, and a spacer unit. The flat panel display unit has a display surface. The lens array unit includes at least one condenser lens, and the at least one condenser lens is disposed on a side of the display surface. The spacer unit is disposed between the display surface and the at least one condenser lens, such that the lens array unit and the flat panel display unit are spaced apart from each other. In a light field system of the stereoscopic image display device, an object distance between the display surface of the flat panel display unit and the at least one condenser lens of the lens array unit is configured to enable an absolute value of a central depth plane (CDP) of the stereoscopic image display device in the light field system to be between 1 mm and 200 mm.

Preferably, when the stereoscopic image display device is in operation, the display surface of the flat panel display unit is configured to generate an integral image, light of the integral image is capable of sequentially passing through the spacer unit and the lens array unit, and the lens array unit is configured to enable the integral image to re-converge in a space above the stereoscopic image display device to form a stereo image that is rearranged.

Preferably, the object distance between the display surface and the at least one condenser lens satisfies a formula of:

$$s = s1 + A_1 H.$$

Among them, s is the object distance; s1 is an equivalent spacing, which is a distance calculated by equating the spacer unit to an air layer; $A_1$ is a position of a vertex of a first surface of the at least one condenser lens, and the first surface is a surface of the at least one condenser lens facing the display surface; H is a position of a first principle point of the at least one condenser lens; and $A_1 H$ is a distance from $A_1$ to H.

Preferably, the spacer unit includes a plurality of light-transmitting layers stacked upon one another, the plurality of light-transmitting layers are sequentially defined as a first light-transmitting layer to an n-th light-transmitting layer along a direction of the display surface of the flat panel display unit toward the at least one condenser lens of the lens array unit, and n is a positive integer not less than 2.

Preferably, the first light-transmitting layer to the n-th light-transmitting layer sequentially have a first thickness T1 to an n-th thickness Tn, and the first light-transmitting layer to the n-th light-transmitting layer sequentially have a first refractive index N1 to an n-th refractive index Nn; in which a calculation formula of an equivalent spacing s1 is:

$$s1 = \frac{T1}{N1} + \ldots + \frac{Tn}{Nn}.$$

Preferably, the equivalent spacing s1 is calculated by: dividing the first thickness T1 to the nth thickness Tn respectively by the first refractive index N1 to the nth refractive index Nn to obtain n values, and then summing up the calculated n values to obtain the equivalent spacing s1.

Preferably, the plurality of light-transmitting layers of the spacer unit is between 2 layers and 20 layers; in which, in the plurality of light-transmitting layers, each of the light-transmitting layers has a thickness between 0.01 mm and 30 mm, and each of the light-transmitting layers has a refractive index between 1 and 2.

Preferably, the plurality of light-transmitting layers of the spacer unit include at least one optical material layer covering the display surface of the flat panel display unit and include at least one support base layer for supporting the at least one condenser lens of the lens array unit.

Preferably, the central depth plane (CDP) of the stereoscopic image display device in the light field system is calculated by substituting the object distance into a lens image formation formula of the light field system.

Preferably, the display surface of the flat panel display unit is display pixels of a liquid crystal display, and the condenser lens is at least one of a spherical lens, an aspheric lens, a lens group, a biconvex lens, a plano-convex lens, a meniscus lens, and a Fresnel lens.

Preferably, the spacer unit is a light-transmitting layer having only a single-layer structure.

Therefore, by virtue of "in a light field system of the stereoscopic image display device, an object distance between the display surface of the flat panel display unit and the condenser lens of the lens array unit being configured to enable an absolute value of a central depth plane (CDP) of the stereoscopic image display device in the light field system to be between 1 mm and 200 mm", the stereoscopic image display device of the present disclosure can effectively improve on problems relating to poor image quality of the stereo image, such as poor color blocking or poor resolution.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Stereoscopic Image Display Device

Figure 1:
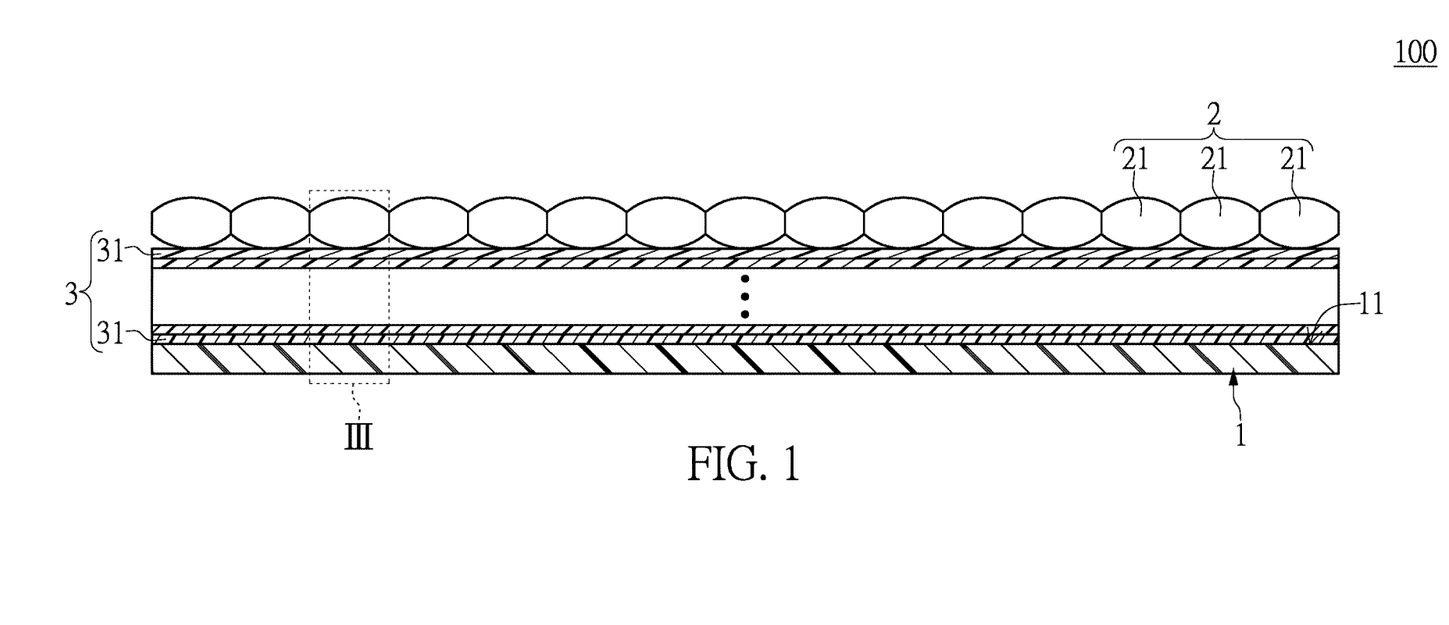
FIG. 1 is a perspective view showing a stereoscopic image display device according to an embodiment of the present disclosure (a condenser lens of the stereoscopic image display device being a biconvex lens)

Referring to FIG. 1, an embodiment of the present disclosure provides a stereoscopic image display device 100. The stereoscopic image display device 100 can be applied to application fields such as optoelectronic, medical treatment, military, exhibition, display, education, entertainment, and consumer electronics. The stereoscopic image display device 100 may be, for example, an active floating 3D image display device, which can display a stereo image in a space above the stereoscopic image display device 100. In addition, the stereoscopic image display device 100 can be installed on any suitable installation position such as a desktop, a floor, or a ceiling when in use.

The stereoscopic image display device 100 of the present embodiment includes: a flat panel display unit 1, a lens array unit 2, and a spacer unit 3. The flat panel display unit 1 has a display surface 11 (also called display pixels), the lens array unit 2 is disposed on a side of the display surface 11 of the flat panel display unit 1, and the spacer unit 3 is disposed between the flat panel display unit 1 and the lens array unit 2, such that the lens array unit 2 and the flat panel display unit 1 are spaced apart from each other through the spacer unit 3.

When the stereoscopic image display device 100 is operated, the display surface 11 of the flat panel display unit 1 is configured to emit light (also called light cluster) to generate an integral image, the light of the integral image is capable of sequentially passing through the spacer unit 3 and the lens array unit 2, and the lens array unit 2 is configured to enable the integral image to re-converge in a space above the stereoscopic image display device 100, so as to form a stereo image that is reorganized.

Further, the flat panel display unit 1 is used to display a pattern produced by the integral photography technology, and the flat panel display unit 1 further includes an arithmetic element used to execute algorithms (not shown in the drawings). In addition, the integral image displayed on the display surface 11 of the flat panel display unit 1 is generated by calculating and re-rendering a flat image, but the present disclosure is not limited thereto.

In some embodiments of the present disclosure, the flat panel display unit 1 may be, for example, an active flat panel display. For example, the flat panel display unit 1 may be an electronic device with an LCD screen or an LED screen, such as a smart phone, a tablet computer, or a flat screen and so on. The present disclosure does not limit the type and structure of the flat panel display unit 1. The feature of the flat panel display unit 1 is to control the switching of stereo images to achieve the effect of dynamic picture display.

In some embodiments of the present disclosure, the flat panel display unit 1 may also be, for example, a passive flat panel display, which can only display static patterns that cannot be freely changed. For example, the flat panel display unit 1 may be, for example, a light box drawing device, a photomask engraving device, a printing drawing device and so on, which can only display the static patterns.

Furthermore, the lens array unit 2 has an ability of controlling light field. The lens array unit 2 includes a plurality of condenser lenses 21, and the plurality of condenser lenses 21 are configured to control a light angle of the stereo image, thereby enabling a user to view the stereo image with different viewing angles. Accordingly, the user can perceive a depth of the stereo image.

A curvature of a mirror surface of each of the condenser lenses 21 is determined by a lens material, and an arrangement of the lens array unit 2 and the flat panel display unit 1 can determine a display height of the stereo image, a range of a viewing angle of the stereo image, and a clarity of the stereo image.

In some embodiments of the present disclosure, each of the condenser lenses 21 is made of a material with good optical characteristics. For example, the material of the condenser lens 21 is selected from a group consisting of glass, poly (methyl methacrylate) (PMMA), polycarbonate (PC), and polyethylene (PE), but the present disclosure is not limited thereto. It should be noted that any material of the condenser lens 21 that has a light transmittance and a degree of softness and hardness suitable for forming a lens falls under the spirit and scope of the present disclosure.

In some embodiments of the present disclosure, the type of the condenser lens 21 may be a lens with light condensing ability or light focusing ability, such as a spherical lens, an aspheric lens, a lens group, a biconvex lens, a plano-convex lens, a meniscus lens, or a Fresnel lens.

In some embodiments of the present disclosure, the plurality of condenser lenses 21 are disposed on one side of the display surface 11 of the flat panel display unit 1, and the spacer unit 3 is disposed between the flat panel display unit 1 and the plurality of condenser lenses 21. In addition, the plurality of condenser lenses 21 are arranged in a matrix manner, a staggered manner, or an irregular manner, and the present disclosure is not limited thereto.

More specifically, the spacer unit 3 includes a plurality of light-transmitting layers 31 that are stacked on each other and disposed between the flat panel display unit 1 and the lens array unit 2. The spacer unit 3 is configured to separate and support the flat panel display unit 1 and the lens array unit 2, and the spacer unit 3 is configured to provide light to pass therethrough.

It is worth mentioning that the above-mentioned light-transmitting layer 31 may be, for example, a light-transmitting layer with a solid medium, such as OCA glue or glass, but the present disclosure is not limited thereto. The light-transmitting layer 31 may also be, for example, a light-transmitting layer with a gaseous medium, such as air or other type of gas; or the light-transmitting layer 31 may also be, for example, a light-transmitting layer with a liquid medium, but the present disclosure is not limited thereto. For example, in the plurality of light-transmitting layers 31, a part of the light-transmitting layers 31 may be designed as the light-transmitting layers with solid medium, and another part of the light-transmitting layers 31 may be designed as the light-transmitting layers with gaseous medium.

Generally, the stereoscopic image display device 100 includes many different light-transmitting layers disposed between the display surface 11 (also called display pixels) of the flat panel display unit 1 and the lens array unit 2, such as an optical material layer (i.e., a protective film, a diffuser film, a brightness enhancement film, and/or a light guide plate) that covers the display surface 11 of the flat panel display unit 1, or a lens support base layer used to support the lens array unit 2.

However, the manner in which the above-mentioned light-transmitting layers are designed is not taken into specific consideration in the conventional stereoscopic image display device. Moreover, no special consideration is given to an object distance between the flat panel display and the lens array unit in the conventional stereoscopic image display device, such that when the conventional stereoscopic image display device is operated to produce a stereo image, the stereo image often has a poor image quality, such as that resulting from color blocking or poor resolution.

To solve the above-mentioned technical inadequacies, a main technical feature of the present disclosure is that an object distance between the display surface 11 (also called display pixels) of the flat panel display unit 1 and the lens array unit 2 needs to meet a predetermined range in design (i.e., between 0.5 mm and 300 mm, and preferably between 1 mm and 150 mm), and an absolute value of a CDP must be between 1 mm and 200 mm, and preferably between 5 mm and 150 mm that is obtained after the object distance substitutes into an image formation formula. Accordingly, the problem of degradation on the stereo image quality of the conventional stereoscopic image display device can be effectively improved.

To clearly describe and understand the main technical features and technical effects of the present disclosure, the following will sequentially describe the lens parameters related to the embodiments of the present disclosure and the derivation steps related to the image formation formula. Among them, the above derivation steps sequentially include derivation step 1 to derivation step 4.

The derivation step 1 is to calculate a refractive power of the condenser lens.

The derivation step 2 is to derive a position of a principle point/principle plane of the condenser lens.

The derivation step 3 is to calculate an equivalent spacing between the display surface of the flat panel display unit and the condenser lens. That is, the spacer unit is equivalent to an air layer.

The derivation step 4 is to calculate an image distance.

Lens Parameters

Figure 2:
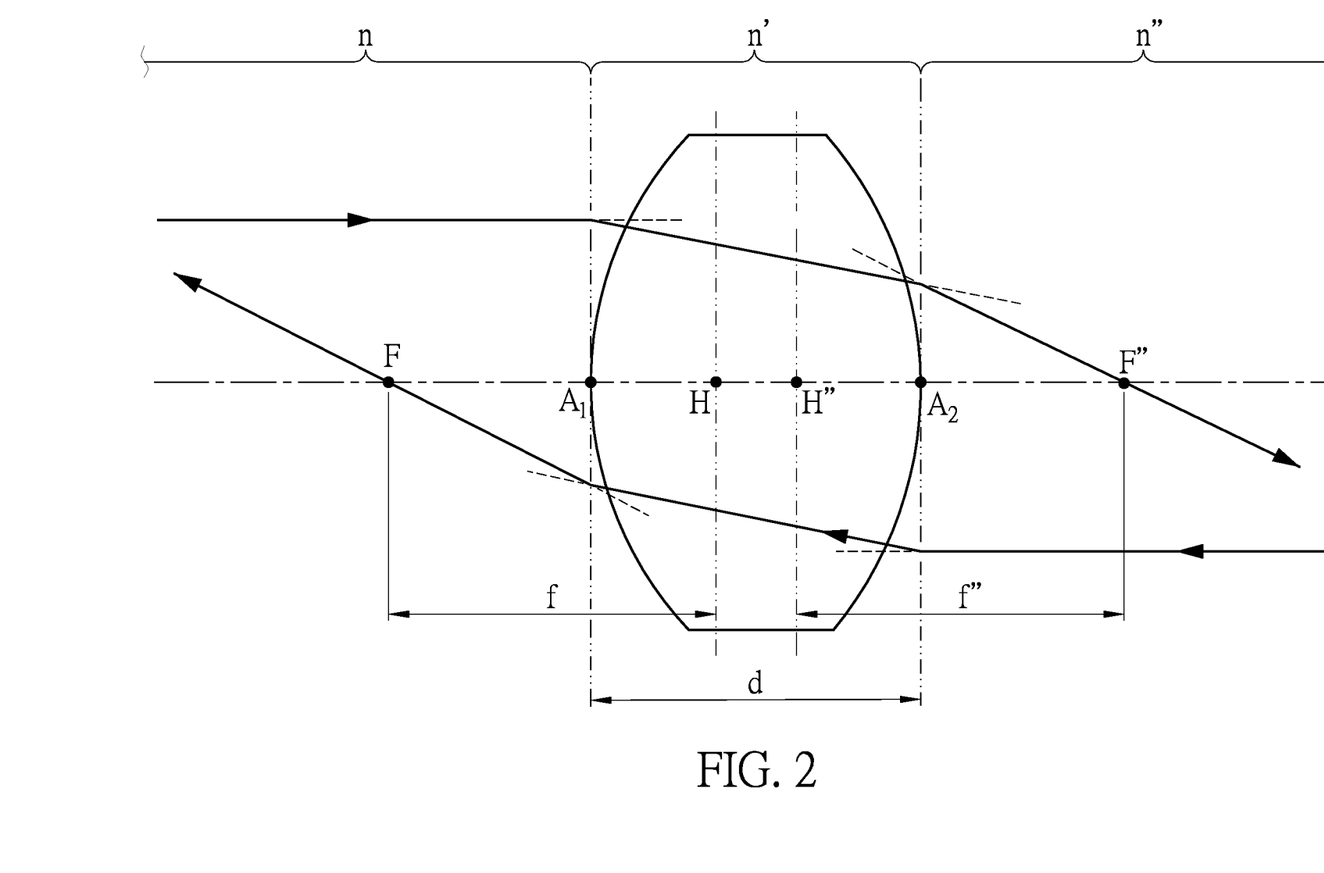
FIG. 2 is a first schematic diagram showing an optical path of the condenser lens according to the embodiment of the present disclosure.

Referring to FIG. 2, the condenser lens of the present embodiment is described by taking a biconvex lens as an example, and the condenser lens has the following parameters.

The lens parameters between the display surface of the flat panel display unit and the condenser lens are as follows:

n is a refractive index of a medium located on a side of an incident surface of the condenser lens. That is, n is a refractive index of a light-transmitting layer located between the display surface of the flat panel display unit and the condenser lens.

$A_1$ is a vertex or an optical midpoint of a first surface of the condenser lens. The first surface is a surface of the condenser lens facing the flat panel display unit. In the present embodiment, the condenser lens is a biconvex lens. The first surface of the condenser lens is a convex curved surface, and can be defined as a first curved surface, but the present disclosure is not limited thereto. For example, the condenser lens may also be a plano-convex lens, and the first surface of the condenser lens may be a flat surface.

$r_1$ (not labeled in the drawings) is a radius of curvature of the first surface of the condenser lens.

H is a first principle point/plane of the condenser lens in an imaging system (light field system) of the stereoscopic image display device.

F is a first focal point in the imaging system.

f (distance from H to F) is a first focal length in the imaging system, and is defined by a distance from the first principle point/plane H to the first focal point F.

Distance from $A_1$ to F is a front focal length in the imaging system, and is defined by a distance from the vertex $A_1$ of the first surface to the first focal point F.

Distance from $A_1$ to H is a distance from the vertex $A_1$ of the first surface of the condenser lens to the first principle point/plane H.

The lens parameters of the condenser lens itself are as follows:

n' is a refractive index of the condenser lens itself.

d is a thickness of the condenser lens itself, and is defined by a distance from $A_1$ to $A_2$.

The lens parameters between the condenser lens and the stereo image are as follows:

n" is a refractive index of a medium located on a side of an emitting surface of the condenser lens. That is, n" is a refractive index of a material medium or an air medium located between the condenser lens and the stereo image.

$A_2$ is a vertex or an optical midpoint of a second surface of the condenser lens. The second surface is a surface of the condenser lens away from the flat panel display unit. In the present embodiment, the condenser lens is a biconvex lens. The second surface of the condenser lens is also a convex curved surface, and can be defined as a second curved surface.

$r_2$ (not labeled in the drawings) is a radius of curvature of the second surface of the condenser lens.

H" is a second principle point/plane of the condenser lens in the imaging system of the stereoscopic image display device.

F" is a second focal point in the imaging system.

F" (distance from H" to F") is a second focal length in the imaging system, and is defined by a distance from the second principle point/plane H" to the second focal point F".

Distance from $A_2$ to F" is a back focal length in the imaging system, and is defined by a distance from the vertex $A_2$ of the second surface to the second focal point F".

Distance from $A_2$ to H" is a distance from the vertex $A_2$ of the second surface of the condenser lens to the second principle point/plane H".

Among the above-mentioned parameters, n, $r_1$, n', d, n", and $r_2$ are the physical quantities that need to be known first and required for the calculation of the subsequent formulas, and other parameters can be derived by substituting these physical quantities into the subsequent formulas.

In addition, it is worth mentioning that, in the above-mentioned imaging system, if the first surface is a convex curved surface, the value of $r_1$ is a positive value; if the first surface is a concave curved surface, the value of $r_1$ is a negative value. Furthermore, if the second surface is a concave curved surface, the value of $r_2$ is a positive value; if the second surface is a convex curved surface, the value of $r_2$ is a negative value.

Derivation Step 1

The derivation step 1 is to calculate the refractive power of the condenser lens by substituting the above known physical quantities of n, $r_1$, n', d, n", $r_2$ into the following formula 1-1 and formula 1-2, and then the values of $P_1$ and $P_2$ can be calculated respectively. Among them, $P_1$ is the refractive power of the first surface (first curved surface), and $P_2$ is the refractive power of the second surface (second curved surface).

$$P_1 = \frac{n' - n}{r_1} \quad \text{(formula 1-1)}$$

$$P_2 = \frac{n'' - n'}{r_2} \quad \text{(formula 1-2)}$$

Next, the values of $P_1$ and $P_2$ obtained from the above calculations are substituted into the following formula 1-3 to calculate the value of P. Among them, P is the refractive power of the lens imaging system.

$$P = P_1 + P_2 - P_1 P_2 \frac{d}{n'} \quad \text{(formula 1-3)}$$

Then, the value of P obtained from the above calculation is substituted into the following formula 1-4, and then the values of f (distance from H to F) and f' (distance from H" to F") can be calculated respectively. Among them, f (distance from H to F) is the first focal length in the imaging system, and f' (distance from H" to F") is the second focal length in the imaging system.

$$P = \frac{n}{f} = \frac{n''}{f''} \quad \text{(formula 1-4)}$$

Derivation Step 2

The derivation step 2 is to derive the positions of the principle points/planes of the condenser lens by substituting the values of $P_1$, $P_2$, P, f, f' obtained from the above calculation into the following formula 2-1 and formula 2-2, and the position of the first principle point/plane H and the position of the second principle point/plane H" of the condenser lens in the imaging system can be calculated respectively. Furthermore, the distance of $A_1H$ and the distance of $A_2H$" can also be calculated.

$$A_1 H = f \frac{d}{f_2'} = \frac{n}{P} \frac{d}{n'} P_2 \quad \text{(formula 2-1)}$$

$$A_2 H'' = -f'' \frac{d}{f_1'} = -\frac{n''}{P} \frac{d}{n'} P_1 \quad \text{(formula 2-2)}$$

Among them, $f_1$ is the first focal length of the first surface (first curved surface), and $f_1'$ is the second focal length of the first surface (first curved surface). Furthermore, $f_2'$ is the first focal length of the second surface (second curved surface), and f2" is the second focal length of the second surface (second curved surface). The relationship between the above parameters is as the following formula 2-3 and formula 2-4.

$$P_1 = \frac{n}{f_1} = \frac{n'}{f_1'} \quad \text{(formula 2-3)}$$

$$P_2 = \frac{n'}{f_2'} = \frac{n''}{f_2''} \quad \text{(formula 2-4)}$$

Derivation Step 3

Figure 3:
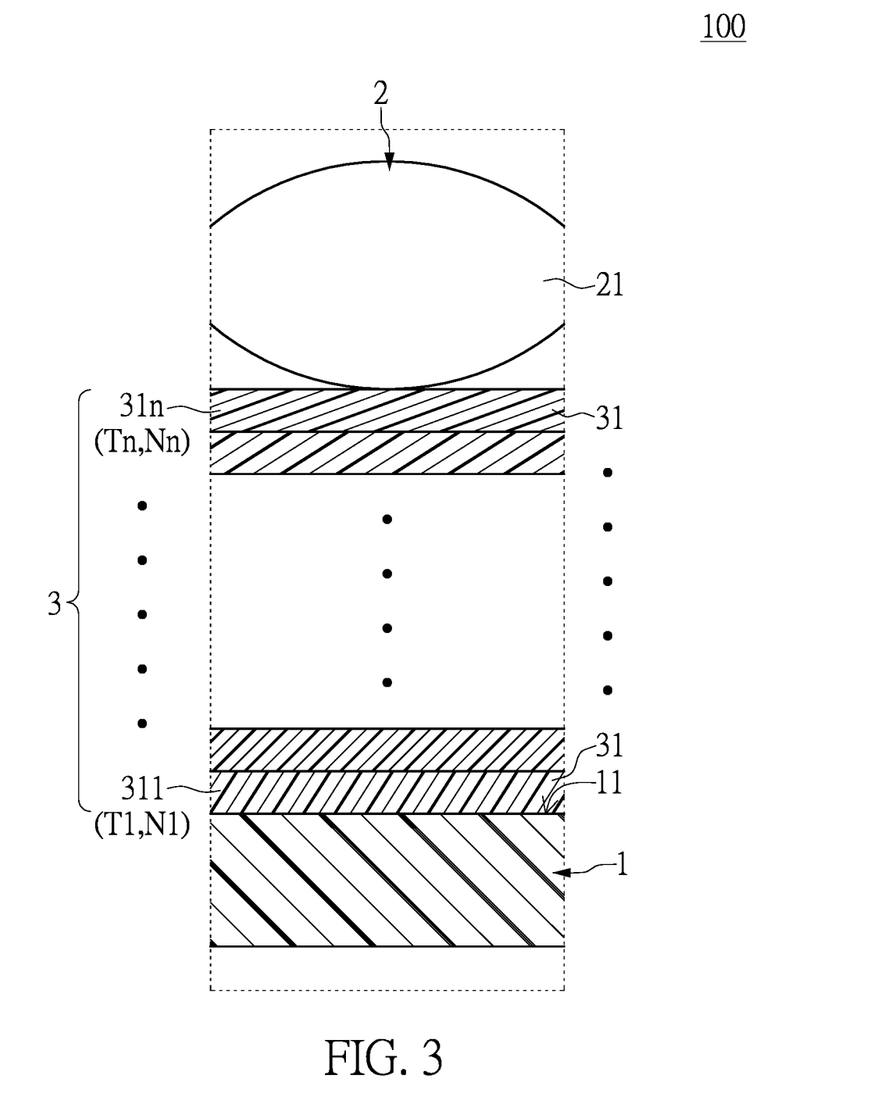
FIG. 3 is a partial enlarged view of section III of FIG. 1, which shows a plurality of light-transmitting layers located between a flat panel display unit and a lens array unit of the stereoscopic image display device.

Referring to FIG. 3, the derivation step 3 is to calculate an equivalent spacing s1 between the display surface 11 (also called display pixels) of the flat panel display unit 1 and the condenser lenses 21 of the lens array unit 2. That is, the light-transmitting layers of the spacer unit 3 are equivalent to an air layer, and the equivalent spacing s1 is the distance calculated after the spacer unit 3 is equivalent to the air layer.

More specifically, before the parameters obtained from the above-mentioned derivation step 1 and derivation step 2 are substituted into the image formation formula of the lens imaging system, the equivalent spacing s1 of the lens array unit 2 needs to be calculated first.

In the light field system of the stereoscopic image display device, a position of the object is the display surface 11 (display pixels) of the flat panel display unit 1. However, in actual applications, the stereoscopic image display device 100 includes many different light-transmitting layers disposed between the display surface 11 (also called display pixels) of the flat panel display unit 1 and the condenser lenses 21 of the lens array unit 2, such as an optical material layer (i.e., a protective film, a diffuser film, a brightness enhancement film, and/or a light guide plate) that covers the display surface 11 of the flat panel display unit 1, or a lens support base layer used to support the lens array unit 2. Therefore, the equivalent spacing s1 needs to be calculated first, and the equivalent spacing s1 is the thickness calculated after the spacer unit 3 is equivalent to the air layer.

Referring to FIG. 3 again, the spacer unit 3 includes a plurality of light-transmitting layers 31 stacked on each other, the plurality of light-transmitting layers 31 are sequentially defined as a first light-transmitting layer 311 to an n-th light-transmitting layer 31n along a direction of the display surface 11 of the flat panel display unit 1 toward the condenser lenses 21 of the lens array unit 2, and n is a positive integer not less than 2, preferably a positive integer between 2 and 20, and more preferably a positive integer between 2 and 10.

Among them, the first light-transmitting layer 311 to the n-th light-transmitting layer 31n sequentially have a first thickness T1 to an n-th thickness Tn, and the first light-transmitting layer 311 to the n-th light-transmitting layer 31n sequentially have a first refractive index N1 to an n-th refractive index Nn.

In the plurality of light-transmitting layers 31, each of the light-transmitting layers 31 (311~31n) has a thickness between 0.01 mm and 30 mm, and the thickness of the plurality of light-transmitting layers 31 may be designed to be the same or different from each other, and the present disclosure is not limited thereto. Among them, the light-transmitting layer with a thickness of 0.01 mm may be, for example, an OCA optical adhesive layer, and the light-transmitting layer with a thickness of 30 mm may be, for example, a glass layer.

In the plurality of light-transmitting layers 31, each of the light-transmitting layers 31 (311 to 31n) has a refractive index between 1 and 2, and the refractive indexes of the plurality of light-transmitting layers 31 may be the same or different from each other, but the present disclosure is not limited thereto. Among them, the light-transmitting layer with a refractive index of 1 may be, for example, an air layer, and the light-transmitting layer with a refractive index of 2 may be, for example, a high refractive index glass layer.

The calculation method of the above-mentioned equivalent spacing s1 is as the following formula 3-1.

$$s1 = \frac{T1}{N1} + \ldots + \frac{Tn}{Nn} \qquad \text{(formula 3-1)}$$

That is, the above-mentioned equivalent spacing s1 is calculated by: dividing the first thickness T1 to the nth thickness Tn respectively by the first refractive index N1 to the nth refractive index Nn to obtain n values, and then summing up the n values to obtain the equivalent spacing s1.

Derivation Step 4

Figure 4:
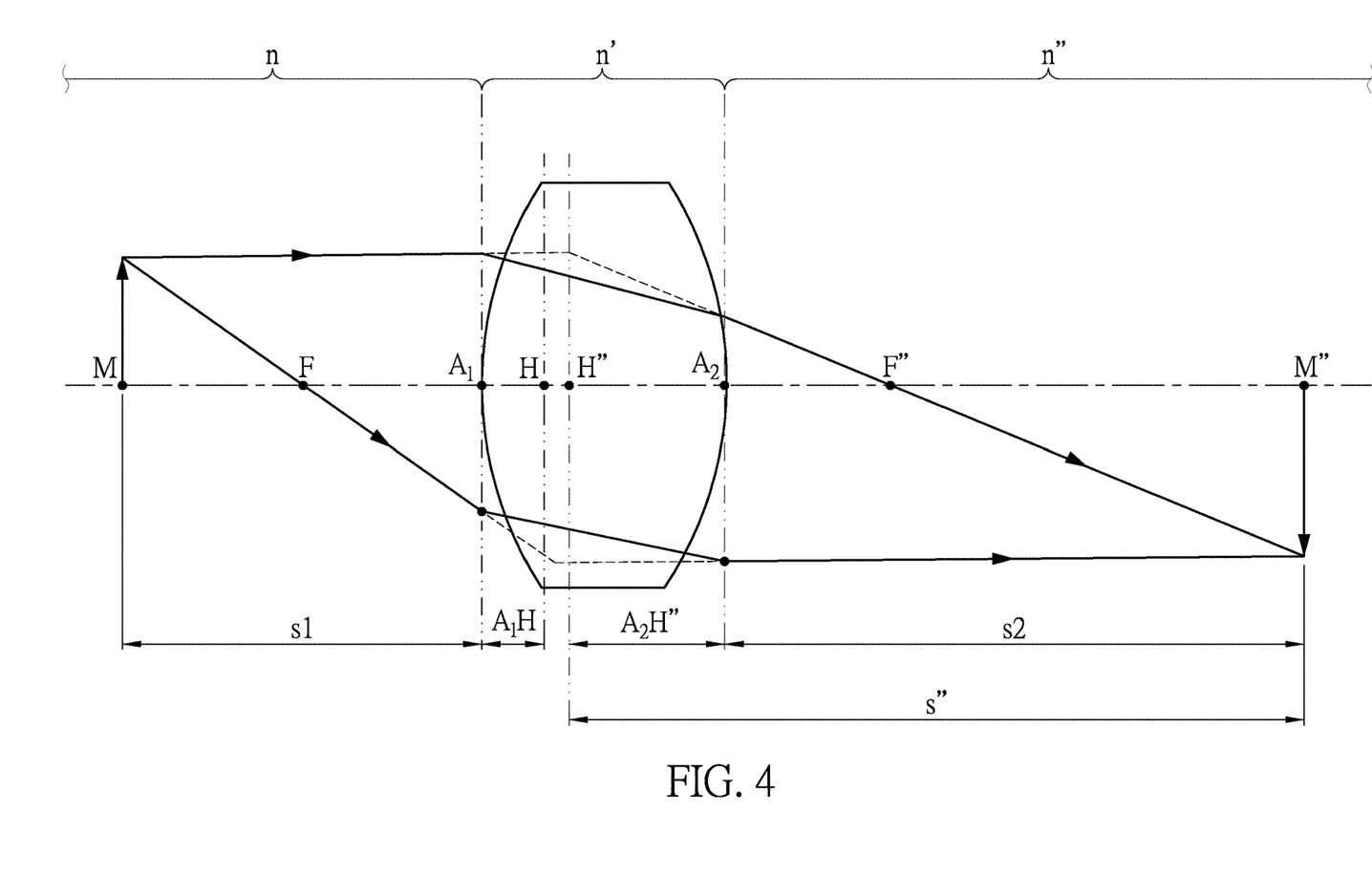
FIG. 4 is a second schematic diagram showing an optical path of the condenser lens according to the embodiment of the present disclosure.

Referring to FIG. 4, the derivation step 4 is to calculate an image distance. More specifically, in the stereo image imaging system, the object distance s is the distance from the object M (i.e., display surface or display pixels) to the first principle point/plane H. That is, the object distance s is the distance s1 (importing the above equivalent distance s1) from the object M to the vertex $A_1$ of the first surface (first curved surface) plus the distance $A_1H$ from the vertex $A_1$ of the first surface to the first principle point/plane H, and the object distance s can be represented by the following formula 4-1.

$$s = s1 + A_1H \qquad \text{(formula 4-1)}$$

Next, the value of the image distance s" can be obtained by substituting the object distance s calculated by the formula 4-1 into the following image formation formula 4-2.

$$\frac{n}{s} + \frac{n''}{s''} = \frac{n}{f} = \frac{n''}{f''} = P \qquad \text{(formula 4-2)}$$

Then, the value of s2 can be obtained by substituting the image distance s" calculated by the formula 4-2 into the following formula 4-3. The value of s2 is the distance from the image M" (stereo image) to the vertex $A_2$ of the second surface (second curved surface).

$$s'' = s2 + A_2H'' \qquad \text{(formula 4-3)}$$

From another perspective, the image distance s" is the distance from the image M" to the second principle point/plane H". That is, the image distance s" is the distance from the image M" to the vertex $A_2$ of the second surface (second curved surface) s2 plus the distance $A_2H$" from the vertex $A_2$ of the second surface to the second principle point/plane H".

Among them, the above-mentioned s2 is theoretically the clearest imaging plane of the reconstructed stereo image, and is also called a central depth plane (CDP).

Range of Central Depth Plane CDP

The central depth plane CDP of the light field system of the stereoscopic image display device 100 according to the embodiment of the present disclosure can be calculated by substituting the lens parameters of the condenser lens 21 of the lens array unit 2 into the above four derivation steps.

If the value of the central depth plane CDP is too small, a degradation of the image quality on a stereo image with a higher imaging height will occur. If the value of the central depth plane CDP is too large, a color blocking problem on the stereo image will occur. Among them, the condenser lens of the present disclosure may be at least one of a spherical lens, an aspheric lens, a lens group, a biconvex lens, a plano-convex lens, a meniscus lens, and a Fresnel lens.

According to the simulation and experimental results, the value of the central depth plane CDP has a better range. That is, an absolute value of the central depth plane CDP value is between 1 mm and 200 mm, and preferably between 5 mm and 150 mm (since the negative image distance is also applicable). The software used for simulation may be ASAP, Zemax, Light Tools, RSoft, Code v, or TracePro, but the present disclosure is not limited thereto.

Based on the above configurations, the stereo image generated from the stereoscopic image display device 100 of the present embodiment can have a better image quality. For example, the stereo image can have a better resolution and no color blocking problem.

From another perspective, the main technical feature of the present disclosure is that the object distance s between the display surface 11 (display pixels) of the flat panel display unit 1 and the condenser lenses 21 of the lens array unit 2 (i.e., the equivalent spacing s1 plus the distance $A_1H$ from the vertex $A_1$ of the first surface to the first principle point/plane H) needs to meet a predetermined range (i.e., 0.5 mm to 300 mm, preferably 1 mm to 150 mm) in design. In addition, the absolute value of the CDP value obtained after the predetermined range is substituted into the image formation formula of the light field system needs to be between 1 mm and 200 mm, and preferably between 5 mm and 150 mm. In this way, the problem of the degradation of the stereo image quality in the conventional art can be effectively improved.

Furthermore, in an imaging system of an integral image, the imaging system can be roughly divided into two types according to the relation between the object distance and the focal length of the lens, such as a resolution priority imaging system and a depth priority imaging system.

When the object distance is greater than the focal length, the mode of this imaging system is called a resolution priority integral image mode (RPII mode). In this mode, the stereoscopic image display device cannot restore the floating stereo image with a higher imaging height, but can only restore the floating stereo image with a lower imaging height. In contrast, in the above-mentioned resolution priority integral image mode, the restored floating stereo image can have a better resolution.

When the object distance is very close to the focal length, the mode of this imaging system is called a depth priority integral image mode (DPII mode). In this mode, the light emitted from the display pixels on the display surface of the stereoscopic image display device can be regarded as approaching parallel light, so that the depth of field (DOF) of the stereo image will be deeper. Furthermore, the resolution of each imaging surface of the stereo image with a high imaging height or a low imaging height will be poor, since the magnification of the light field system is much larger than that of the RPII.

When the absolute value of the central depth plane CDP value is too small, the imaging system can be regarded as close to the RPII mode. Accordingly, the image quality of a floating stereo image with a higher imaging height will drop sharply. When the absolute value of the central depth plane CDP value is too large, the imaging system can be regarded as close to the DPII mode, and the light emitted from the display pixels on the display surface of the stereoscopic image display device can be regarded as close to parallel light. Generally, screen pixels are composed of RGB three-color sub-pixels, so that when the light emitted from the display pixels is close to parallel light and the magnification of the light field system is large, the three-color sub-pixels cannot be effectively mixed with each other, thereby causing the color block problem.

Figure 5:
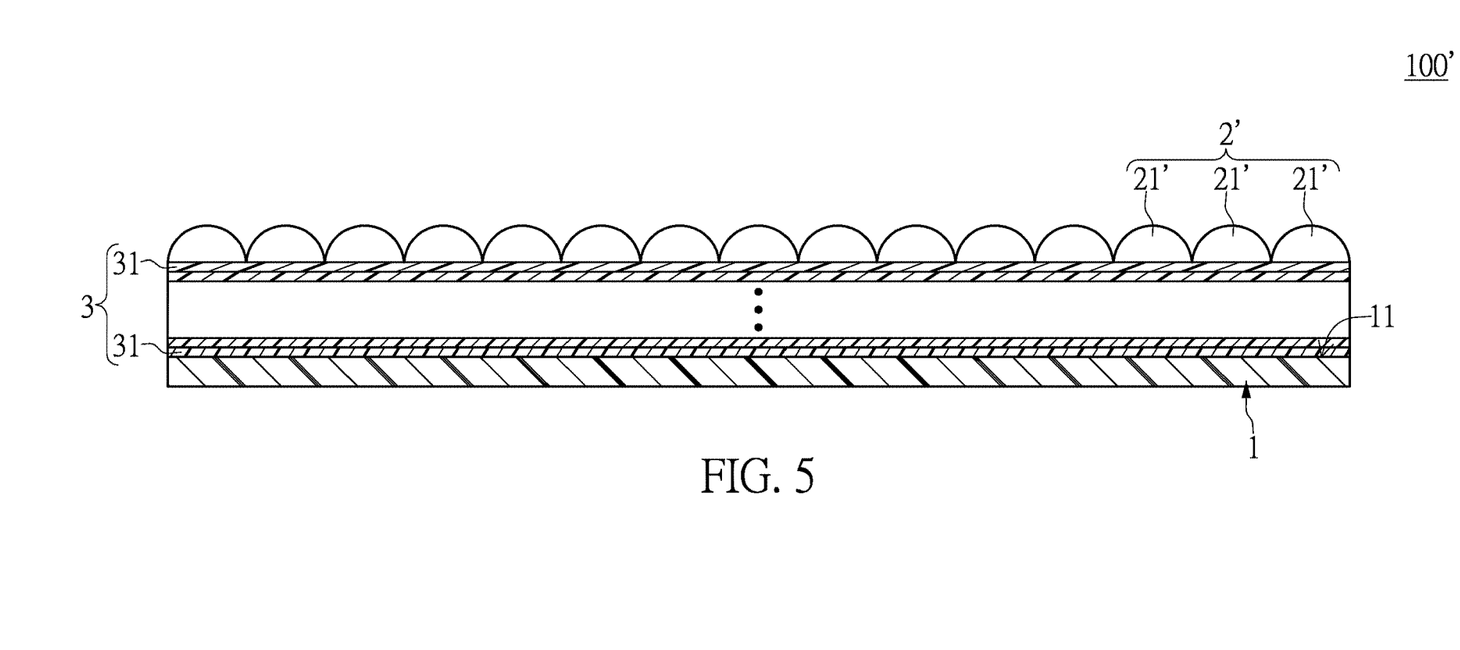
FIG. 5 is a perspective view showing a stereoscopic image display device according to another embodiment of the present disclosure (a condenser lens being a plano-convex lens)

As shown in FIG. 5, in another embodiment of the present disclosure, a plurality of condenser lenses 21' of lens array unit 2' of a stereoscopic image display device 100' are all plano-convex lenses. The plurality of condenser lenses 21' are designed to enable the absolute value of the central depth plane (CDP) to be between 1 mm and 200 mm, which conforms to the protection spirit of the present disclosure and belongs to the protection scope of the present disclosure.

Figure 6:
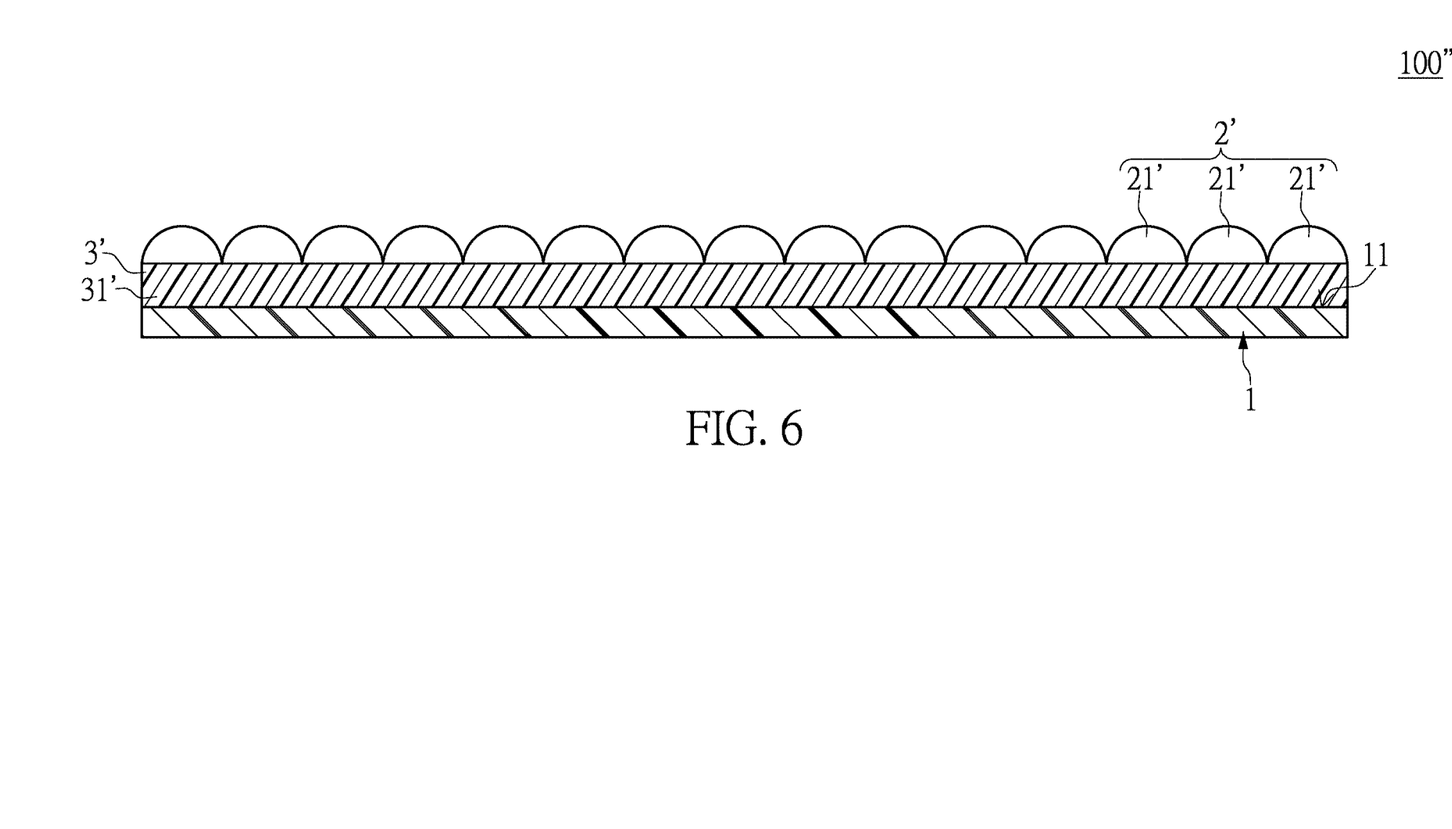
FIG. 6 is a perspective view showing a stereoscopic image display device according to yet another embodiment of the present disclosure (a spacer unit having a single-layer structure).

As shown in FIG. 6, in still another embodiment of the present disclosure, a spacer unit 3' of a stereoscopic image display device 100" may also be, a light-transmitting layer 31' merely having a single-layer structure. The spacer unit 3' is designed to enable the absolute value of the central depth plane (CDP) to be between 1 mm and 200 mm, which conforms to the protection spirit of the present disclosure, and belongs to the protection scope of the present disclosure.

Furthermore, the light-transmitting layer 31' having the single-layer structure can be, for example, a light-transmitting layer with a solid medium, a gaseous medium, or a liquid medium, and the present disclosure is not limited thereto.

Beneficial Effects of the Embodiments

In conclusion, by virtue of "in the light field system of the stereoscopic image display device, the object distance between the display surface of the flat panel display unit and the condenser lens of the lens array unit being configured to enable the absolute value of the central depth plane (CDP) of the stereoscopic image display device in the light field system to be between 1 mm and 200 mm", the stereoscopic image display device of the present disclosure can effectively improve on problems relating to poor image quality of the stereo image, such as poor color blocking or poor resolution.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A stereoscopic image display device, comprising:
   a flat panel display unit having a display surface;
   a lens array unit including at least one condenser lens, the at least one condenser lens being disposed on a side of the display surface; and
   a spacer unit being disposed between the display surface and the at least one condenser lens, such that the lens array unit and the flat panel display unit are spaced apart from each other;
   wherein, in a light field system of the stereoscopic image display device, an object distance between the display surface of the flat panel display unit and the at least one condenser lens of the lens array unit satisfies a predetermined range of 0.5 mm to 300 mm, and the object distance is configured to enable an absolute value of a central depth plane (CDP) of the stereoscopic image display device in the light field system to be between 1 mm and 200 mm; wherein the CDP of the stereoscopic image display device in the light field system is calculated by substituting the object distance into a lens image formation formula of the light field system;

wherein the object distance between the display surface and the at least one condenser lens satisfies a formula of:

$$s=s1+A1H;$$

wherein s is the object distance; s1 is an equivalent spacing; $A_1$ is a position of a vertex of a first surface of the at least one condenser lens, the first surface being a surface of the at least one condenser lens facing the display surface; H is a position of a first principle point of the at least one condenser lens; and $A_1H$ is a distance from $A_1$ to H;

wherein the spacer unit includes a plurality of light-transmitting layers stacked upon one another, the plurality of light-transmitting layers are sequentially defined as a first light-transmitting layer to an n-th light-transmitting layer along a direction of the display surface of the flat panel display unit toward the at least one condenser lens of the lens array unit, and n is a positive integer not less than 2;

wherein the first light-transmitting layer to the n-th light-transmitting layer respectively have a first thickness T1 to an n-th thickness Tn, and the first light-transmitting layer to the n-th light-transmitting layer sequentially have a first refractive index N1 to an n-th refractive index Nn; wherein a calculation formula of the equivalent spacing s1 is:

$$s1 = \frac{T1}{N1} + \ldots + \frac{Tn}{Nn};$$

wherein the plurality of light-transmitting layers of the spacer unit is between 2 layers and 20 layers; wherein, in the plurality of light-transmitting layers, each of the light-transmitting layers has a thickness between 0.01 mm and 30 mm, and each of the light-transmitting layers has a refractive index between 1 and 2.

2. The stereoscopic image display device according to claim 1, wherein, when the stereoscopic image display device is in operation, the display surface of the flat panel display unit is configured to generate an integral image, light of the integral image is capable of sequentially passing through the spacer unit and the lens array unit, and the lens array unit is configured to enable the integral image to re-converge in a space above the stereoscopic image display device to form a stereo image that is rearranged.

3. The stereoscopic image display device according to claim 1, wherein the plurality of light-transmitting layers of the spacer unit include at least one optical material layer covering the display surface of the flat panel display unit, and include at least one support base layer for supporting the at least one condenser lens of the lens array unit.

4. The stereoscopic image display device according to claim 1, wherein the display surface of the flat panel display unit is display pixels of a liquid crystal display, and the condenser lens is at least one of a spherical lens, an aspheric lens, a lens group, a biconvex lens, a plano-convex lens, a meniscus lens, and a Fresnel lens.

* * * * *